US008675726B2

(12) United States Patent
Zan et al.

(10) Patent No.: US 8,675,726 B2
(45) Date of Patent: Mar. 18, 2014

(54) METHOD AND ENCODER FOR CONSTRAINED SOFT-DECISION QUANTIZATION IN DATA COMPRESSION

(75) Inventors: Jinwen Zan, Kitchener (CA); Dake He, Waterloo (CA); En-Hui Yang, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 640 days.

(21) Appl. No.: 12/707,729

(22) Filed: Feb. 18, 2010

(65) Prior Publication Data

US 2011/0200101 A1  Aug. 18, 2011

(51) Int. Cl.
*H04N 7/12* (2006.01)
*H04N 11/02* (2006.01)

(52) U.S. Cl.
USPC ..................................... 375/240; 375/E7.139

(58) Field of Classification Search
None
See application file for complete search history.

(56) References Cited

U.S. PATENT DOCUMENTS

| | | | | | |
|---|---|---|---|---|---|
| 5,969,764 | A | * | 10/1999 | Sun et al. | 375/240.06 |
| 7,570,827 | B2 | * | 8/2009 | Yang et al. | 382/245 |
| 7,616,690 | B2 | * | 11/2009 | De Vleeschouwer | 375/240.16 |
| 8,005,140 | B2 | * | 8/2011 | Yang et al. | 375/240.03 |
| 2004/0184541 | A1 | * | 9/2004 | Brockmeyer et al. | 375/240.16 |
| 2006/0013497 | A1 | | 1/2006 | Yang et al. | |
| 2007/0217506 | A1 | | 9/2007 | Yang et al. | |
| 2008/0069242 | A1 | * | 3/2008 | Xu et al. | 375/240.24 |
| 2009/0304090 | A1 | * | 12/2009 | Cordara et al. | 375/240.26 |

OTHER PUBLICATIONS

Chen et al, "Improved Rate Control for MPEG-4 Video Transport over Wireless Channel", Signal Processing: Image Communication, vol. 18, 2003, pp. 879-887.*
Ribas-Corbera et al, "Rate Control in DCT Video Coding for Low-DEaly Communications", IEEE Trans. Circuits and Systems for Video Technology, vol. 9, No. 1, Feb. 1999, pp. 172-185.*
Chiang et al, "A New Rate Control Scheme using Quadratic Rate Distortion Model", IEEE Trans. Circuits and Systems for Video Technology, vol. 7, No. 1, Feb. 1997, pp. 246-250.*
Hang et al, "Source Model for Transform Video Coder and Its Application—Part I: Fundamental Theory", IEEE Trans. Circuits and Systems for Video Technology, vol. 7, No. 2, Apr. 1997, pp. 287-298.*
Hang et al, "Source Model for Transform Video Coder and Its Application—Part II: Variable Frame Rate Coding", IEEE Trans. Circuits and Systems for Video Technology, vol. 7, No. 2, Apr. 1997, pp. 299-311.*
Wiegand, et al, "Rate-Constrained Coder Control and Comparison of Video Coding Standards", IEEE Trans. Circuits and Systems for Video Technology, vol. 13, No. 7, Jul. 2003, pp. 688-703.*

(Continued)

*Primary Examiner* — Gims S Philippe
*Assistant Examiner* — Reza Aghevli
(74) *Attorney, Agent, or Firm* — Rowand LLP (57) ABSTRACT

A method of encoding a video using constrained soft-decision quantization. The soft-decision quantization includes first performing hard-decision quantization to obtain hard quantized coefficients and, then, obtaining a soft quantized coefficient using a rate-distortion calculation over a search range of quantization levels for a transform domain coefficient, wherein the search range of quantization levels for that transform domain coefficient is constrained within a number of quantization levels of a corresponding hard quantized coefficient. The search range may be based upon a fixed threshold, the coefficient position, the hard quantized coefficient magnitude, a threshold value less accumulated distortion, or other factors, including combinations of these factors. The accumulated distortion may be measured by an L1 norm.

19 Claims, 9 Drawing Sheets

(56) References Cited

OTHER PUBLICATIONS

M. Karczewicz, Y. Ye, and I. Chong, "Rate-Distortion Optimized Quantization," document No. VCEG-AH21, Antalya, Turkey, Jan. 2008.

E.-H- Yang, and X. Yu, "Rate Distortion Optimization for H.264 interframe coding: a general framework and algorithms", IEEE Transactions on Image Processing, vol. 16, No. 7, pp. 1774-1784, Jul. 2007.

En-hui Yang, and Xiang Yu, "Soft Decision Quantization for H.264 With Main Profile Compatibility", IEEE Transactions on Circuits and Systems for Video Technology, vol. 19, No. 1, Jan. 2009.

Andrew J. Viterbi, "Error Bounds for Convolutional Codes and an Asymptotically Optimum Decoding Algorithm", IEEE Transactions on Information Theory, vol. IT-13, No. 2, Apr. 1967.

ITU-T Rec. H.264/AVC, Advance Video Coding for Generic Audio-visual services, 2005.

H.264/AVC reference software, available online http://iphome.hhi.de/surhring/tml/.

En-Hui Yang et al: "Rate Distortion Optimization for H.264 Interframe Coding: A General Framework and Algorithms" IEEE Transactions on Image Processing, IEEE Service Center, Piscataway, NJ, US LNKD-DOI:10.1109/TIP.2007.896685, vol. 16, No. 7, Jul. 1, 2007, pp. 1774-1784, XP011185448.

En-Hui Yang et al: "Soft Decision Quantization for H.264 With Main Profile Compatibility" IEEE Transactions on Circuits and Systems for Video Technology, IEEE Service Center, Piscataway, NJ, US, vol. 16, No. 1, Jan. 1, 2009, pp. 122-127, XP011239523.

Matthew Crouse et al: "Joint Thresholding and Quantizer Selection for Transform Image Coding: Entropy-Constrained Analysis and Applications to Baseline JPEG" IEEE Transactions on Image Processing, IEEE Service Center, Piscataway, NJ, US, vol. 6, No. 2, Feb. 1, 1997, XP011026108.

Supplementary European Search Report dated Sep. 3, 2010.

\* cited by examiner

PRIOR ART

FIG. 1

PRIOR ART

PRIOR ART

METHOD AND ENCODER FOR CONSTRAINED SOFT-DECISION QUANTIZATION IN DATA COMPRESSION

FIELD

The present application generally relates to data compression, such as for image or video encoding, and, in particular, the use of constrained soft-decision quantization in data compression.

BACKGROUND

The current state-of-the-art for video encoding is the ITU-T H.264/AVC video coding standard. It defines a number of different profiles for different applications, including the Main profile, Baseline profile and others.

There are a number of standards for encoding/decoding images and videos, including H.264/AVC, that use block-based coding processes. In these processes, the image or frame is divided into blocks, typically 4×4 or 8×8, and the blocks are spectrally transformed into transform domain coefficients. The transform domain coefficients are then quantized and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction).

Rate-distortion optimization is used to improve coding performance. Rate-distortion optimization processes have focused upon selecting a coding mode, motion vector and/or quantization step size that minimizes a rate-distortion cost expression.

A further rate-distortion optimization process employs the transform domain coefficients themselves as a free parameter in the rate-distortion analysis. This is termed "soft-decision quantization", as described in US patent publication 2006/0013497 to Yang et al. (hereinafter "Yang 1") and US patent publication 2007/0217506 to Yang et al (hereinafter "Yang 2"). The term soft-decision quantization ("SDQ") is used to distinguish from "hard-decision quantization", which is a quantization process in which quantization decisions are made without including the transform domain coefficients as a free parameter in the rate-distortion analysis. The process described in Yang 1 details an example of SDQ in the context of JPEG image encoding using Huffman tables. The process described in Yang 2 details an example of SDQ in the context of H.264 video encoding using context adaptive variable length coding (CAVLC).

In the soft-decision quantization described in Yang 2, a trellis of states is built reflecting the various quantization levels for the transform domain coefficients and reflecting the costs associated with encoding each quantized coefficient, given the previous output (for example using CABAC or CALVC).

While soft-decision quantization tends to lead to improved rate-distortion performance, it is computationally demanding due to the need to evaluate all states in the trellis.

It would be advantageous to provide for an improved encoder and methods or processes for encoding.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In one aspect, the present application discloses a method of encoding a video, the video including a block of pixel data, the pixel data for the block having been transformed to a set of transform domain coefficients. The method includes quantizing the set of transform domain coefficients using a quantization step size to obtain a set of hard quantized coefficients. The method further includes, for each of the transform domain coefficients in the set of transform domain coefficients, performing soft decision quantization to obtain a soft quantized coefficient using a rate-distortion calculation over a search range of quantization levels for that transform domain coefficient, wherein the search range of quantization levels for that transform domain coefficient is constrained within a number of quantization levels of the hard quantized coefficient. The method also includes entropy encoding the soft quantized coefficients to generate encoded video data.

In another aspect, the present application describes an encoder for encoding a video. The encoder includes a processor; a memory; and an encoding application stored in memory and containing instructions for configuring the processor to encode the video using the method described above.

In yet another aspect, the present application describes a computer-readable medium having stored thereon computer-executable instructions which, when executed by a processor, configure the processor to execute the method described above.

Other aspects and features of the present application will be understood by those of ordinary skill in the art from a review of the following description of examples in conjunction with the accompanying figures.

In the description that follows, example embodiments are described with reference to the ITU-T Reference H.264/AVC standard. Those ordinarily skilled in the art will understand that the present application is not limited to H.264/AVC but may be applicable to other data, image, or video encoding/decoding standards, including evolutions of the H.264 standard.

In the description that follows, when referring to video data the terms frame and slice are used somewhat interchangeably. Those of skill in the art will appreciate that, in the case of the H.264/AVC standard, a frame may contain one or more slices. It will also be appreciated that certain encoding/decoding operations are performed on a frame-by-frame basis and some are performed on a slice-by-slice basis, depending on the particular requirements of the applicable video coding standard. In any particular embodiment, the applicable video coding standard may determine whether the operations described below are performed in connection with frames and/or slices, as the case may be. Accordingly, those ordinarily skilled in the art will understand, in light of the present disclosure, whether particular operations or processes described herein and particular references to frames, slices, or both for a given embodiment.

Figure 1:
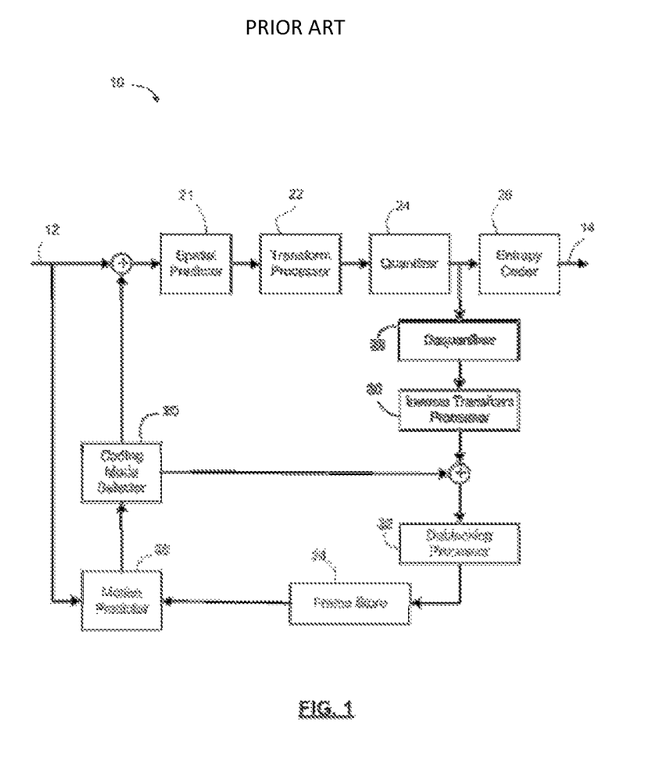
FIG. 1 shows, in block diagram form, an encoder for encoding video.
Figure 2:
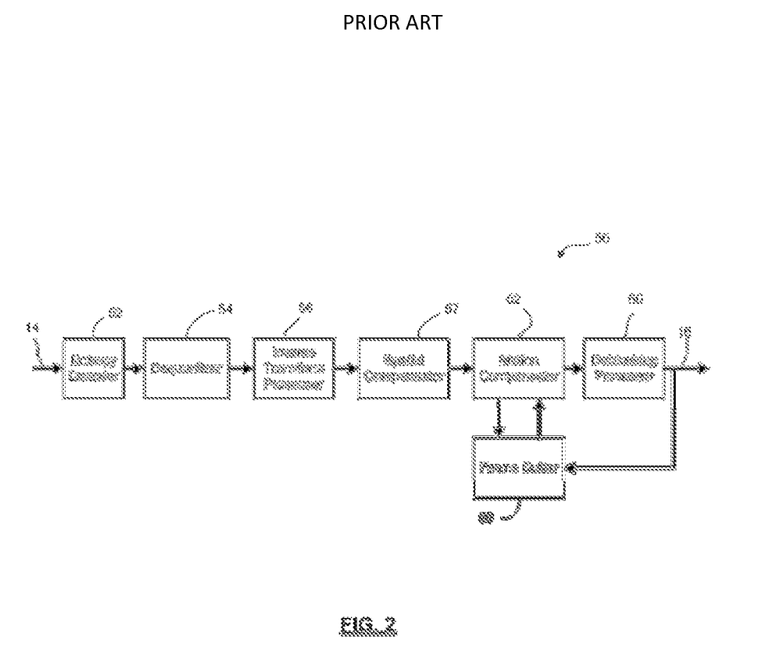
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards. For example, the encoder 10 and decoder 50 may be H.264/AVC compliant. In other embodiments, the encoder 10 and decoder 50 may conform to other video compression standards, including evolutions of the H.264/AVC standard.

The encoder 10 includes a spatial predictor 21, a coding mode selector 20, transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular macroblocks within the frame/slice are inter or intra coded. The transform processor 22 performs a transform upon the spatial domain data. In many embodiments, the transform is a block-based spectral transform. For example, in many embodiments a discrete cosine transform (DCT) is used. Other embodiments may use other transforms, including a discrete sine transform. The transform is performed on a macroblock or sub-block basis, depending on the size of the macroblocks. In the H.264/AVC standard, for example, a typical 16×16 macroblock contains sixteen 4×4 transform blocks and the DCT process is performed on the 4×4 blocks. In some cases, the transform blocks may be 8×8, meaning there are four transform blocks per macroblock. In yet other cases, the transform blocks may be other sizes. The transform of the spatial domain data results in a set of transform domain coefficients.

The set of transform domain coefficients for each block is quantized by the quantizer 24. The quantized transform domain coefficients and associated information are then encoded by the entropy encoder 26. The entropy encoder may apply any suitable coding, including CALVC and context adaptive binary arithmetic coding (CABAC).

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction algorithm, the source data of the block may be converted to residual data. The transform processor 22 then transforms the residual data into the set of transform domain coefficients. H.264/AVC, for example, prescribes nine spatial prediction modes for 4×4 transform blocks. In some embodiments, each of the nine modes may be used to independently process a block, and then rate-distortion optimization is used to select the best mode.

The H.264/AVC standard also prescribes the use of motion prediction/compensation to take advantage of temporal prediction. Accordingly, the encoder 10 has a feedback loop that includes a de-quantizer 28, inverse transform processor 30, and deblocking processor 32. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved. A motion predictor 36 uses the frames/slices stored in the frame store 34 as source frames/slices for comparison to a current frame for the purpose of identifying similar blocks. Accordingly, for macroblocks to which motion prediction is applied, the "source data" which the transform processor 22 encodes is the residual data that comes out of the motion prediction process. For example, it may include information regarding the reference frame, a spatial displacement or "motion vector", and residual pixel data that represents the differences (if any) between the reference block and the current block. Information regarding the reference frame and/or motion vector may not be processed by the transform processor 22 and/or quantizer 24, but instead may be supplied to the entropy encoder 26 for encoding as part of the bitstream along with the quantized coefficients.

Those ordinarily skilled in the art will appreciate the details and possible variations for implementing H.264/AVC encoders.

The decoder 50 includes an entropy decoder 52, dequantizer 54, inverse transform processor 56, spatial compensator 57, and deblocking processor 60. A frame buffer 58 supplies reconstructed frames for use by a motion compensator 62 in applying motion compensation. The spatial compensator 57 represents the operation of recovering the video data for a particular intra-coded block from a previously decoded block.

The bitstream 14 is received and decoded by the entropy decoder 52 to recover the quantized coefficients. Side information may also be recovered during the entropy decoding process, some of which may be supplied to the motion compensation loop for using in motion compensation, if applicable. For example, the entropy decoder 52 may recover motion vectors and/or reference frame information for inter-coded macroblocks.

The quantized coefficients are then dequantized by the dequantizer 54 to produce the transform domain coefficients, which are then subjected to an inverse transform by the inverse transform processor 56 to recreate the "video data". It will be appreciated that, in some cases, such as with an intra-coded macroblock, the recreated "video data" is the residual data for use in spatial compensation relative to a previously decoded block within the frame. The spatial compensator 57 generates the video data from the residual data and pixel data from a previously decoded block. In other cases, such as inter-coded macroblocks, the recreated "video data" from the inverse transform processor 56 is the residual data for use in motion compensation relative to a reference block from a different frame.

The motion compensator 62 locates a reference block within the frame buffer 58 specified for a particular inter-coded macroblock. It does so based on the reference frame information and motion vector specified for the inter-coded macroblock. It then supplies the reference block pixel data for combination with the residual data to arrive at the recreated video data for that macroblock.

A deblocking process may then be applied to a reconstructed frame/slice, as indicated by the deblocking processor 60. After deblocking, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

Soft-Decision Quantization

Conventional implementations of H.264 video encoding employ "hard-decision" quantization. The term hard-decision quantization ("HDQ") refers to ordinary quantization applied to transform domain coefficients based on a selected one of the defined quantization step sizes. The output of the HDQ quantization process is a set of quantized coefficients developed directly from quantizing the set of transform domain coefficients using the selected quantization step size. The output of this process may be referred to herein as a "hard quantized coefficient". It is carried out without regard to the entropy encoding process that follows. The coding rate of the quantized coefficients does not factor into the quantization process in a rate-distortion sense.

Rate-distortion optimization processes can, in some instances, employ the transform domain coefficients themselves as a free parameter in the rate-distortion analysis. This is termed "soft-decision quantization". In a soft-decision quantization ("SDQ") process, a quantized coefficient may be different from the corresponding quantized coefficient under HDQ if the resulting distortion is sufficiently offset by a gain in coding efficiency, as determined by a rate-distortion optimization analysis. As noted above, US patent publication 2006/0013497 to Yang et al. (hereinafter "Yang 1") and US patent publication 2007/0217506 to Yang et al (hereinafter "Yang 2") describe example applications of SDQ to image encoding and video encoding, respectively. The contents of Yang 1 and Yang 2 are incorporated herein by reference.

In order to assess what quantization level to select for a given coefficient, the rate-distortion impact of the various quantization levels needs to be evaluated. This involves assessing the distortion impact of a given quantization level and the coding rate impact of selecting that quantization level. The coding rate impact depends upon the coding syntax used to entropy encode the quantization levels for the coefficients. A context-based coding syntax means there are interdependencies among quantization levels that impact the coding rate that need to be taken into account in the rate-distortion analysis. For example, H.264 employs either context adaptive variable length coding (CAVLC) or context adaptive binary arithmetic coding (CABAC), both of which require an awareness of context to assess the coding impact of a given coefficient's quantization level. In other words, the coding rate impact of a given quantization level partly depends upon the quantization levels of previous coefficients.

Yang 2 describes an example application of SDQ in an H.264 encoder using CAVLC. Yang 2 suggests building a trellis having a stage for each coefficient, and each stage having a set of nodes corresponding to a particular parameter of the encoding scheme (in Yang 2's example, the parameter is ZerosLeft). Within each node are a number of states reflecting different settings of other parameters in the encoding scheme (in Yang 2's example, the parameters include the number of trailing ones and the level coding table). Parallel paths or connections arriving at a state from a given state of an earlier node reflect the range of quantization levels that may be selected for the state. Each coding level has a distortion associated with it and each connection or path has a coding rate associated with it that depends upon the quantization level at the end of the path and the quantization level at the beginning of the path.

Figure 3:
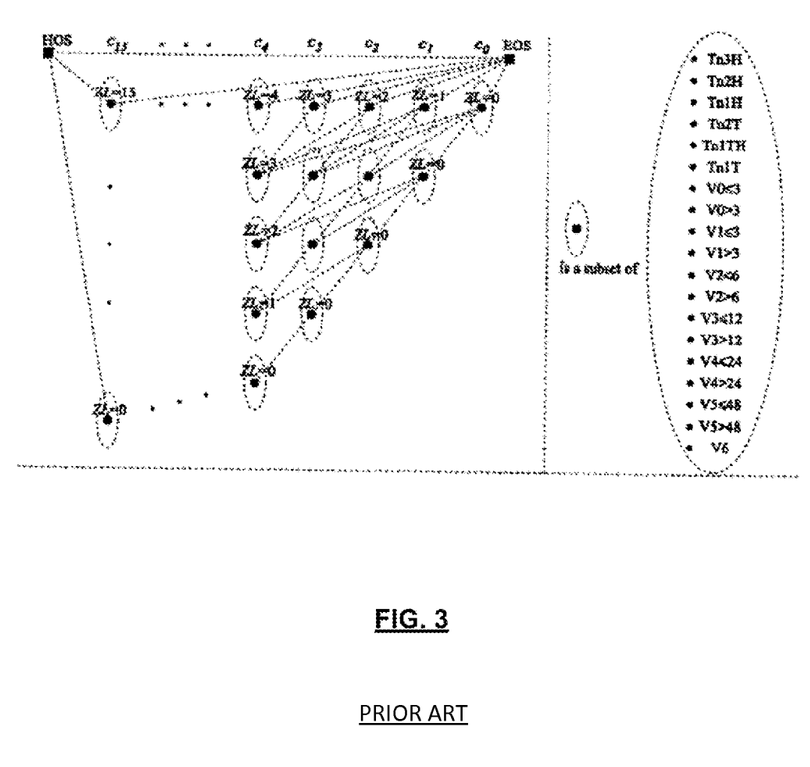
FIG. 3 shows an example partial trellis for performing SDQ by evaluating rate-distortion cost of possible quantization levels for a set of transform domain coefficients.

An example partial trellis for performing SDQ by evaluating rate-distortion cost of possible quantization levels for a set of transform domain coefficients is shown in FIG. 3. The trellis shown is specific to the CALVC encoding method specified in H.264. A different CALVC process may result in a different trellis having different parameters. Moreover, use of a different entropy encoding method, such as CABAC or Huffman encoding, would result in a different trellis having different parameters for defining nodes and states. Nevertheless, in any such trellis, each stage corresponds to a coefficient in the set of transform domain coefficients and the interconnections between states reflect the rate-distortion cost associated with selecting a given quantization level having regard to a particular quantization level for an earlier coefficient in the set. Connections between states are valid if they are permissible within the coding syntax.

It will be appreciated that building the trellis and evaluating the rate-distortion cost associated with every quantization level for every coefficient is computationally intensive. In particular, evaluating the many parallel transitions to a given state from an earlier state is computationally demanding.

Constrained Soft-Decision Quantization

In order to reduce the computational demand associated with SDQ, the present application proposes to improve the computational speed of SDQ by limiting the search of the full range of quantization levels. By reducing the number of quantization levels evaluated, a number of states and connections in the trellis can be eliminated or rendered "invalid", thereby reducing the computational complexity. The search over a reduced search space may be referred to herein as "constrained soft-decision quantization".

In one aspect, the present application proposes that the search space be limited to quantization levels within a defined neighborhood of the quantized coefficients determined through HDQ. It has been found that, for a set of transform domain coefficients, the resulting quantization levels selected through SDQ do not diverge greatly from the quantization levels selected through HDQ. Accordingly, the vector of quantization levels obtained through HDQ supplies a solid starting point for the SDQ search, and the search may be limited to neighborhood around the quantization levels selected through HDQ.

Figure 4:
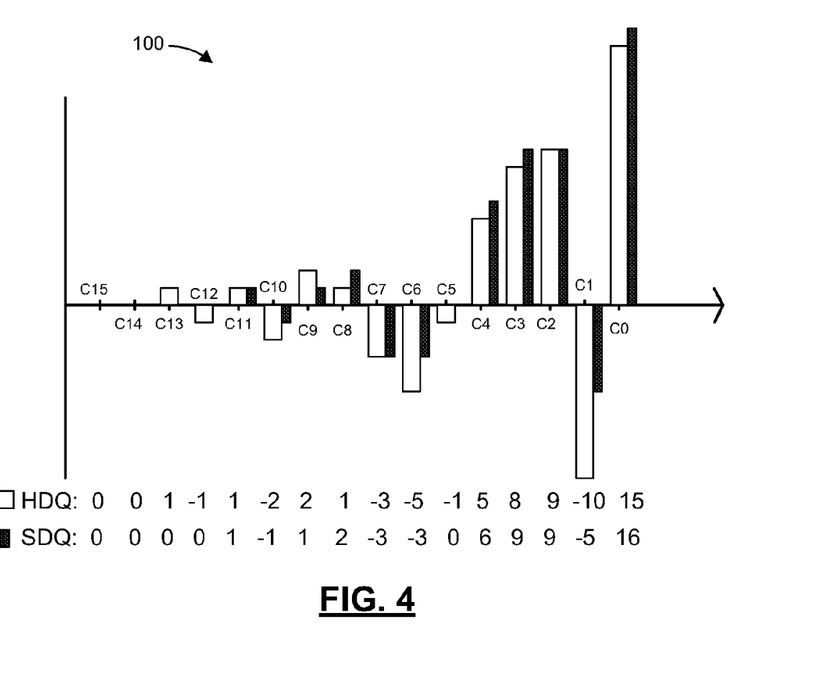
FIG. 4 shows an example set of quantized coefficients C0 to C15 in graphical form.

Reference is now made to FIG. 4, which shows an example set of quantized coefficients C0 to C15 in graphical form, for the case of a 4×4 DCT. The graph 100 shows the hard-decision quantized coefficients, i.e. the quantization levels for the coefficients using HDQ. The graph 100 also shows the soft-decision quantized coefficients, i.e. the quantization levels for the coefficients using SDQ. The example set of coefficients is shown in reverse order (the order in which the quantized coefficients may be encoded) from C15 to C0. The following table details the values of the HDQ and SDQ quantization levels for each coefficient in the example. The SDQ values vary from the HDQ values to a degree, which will result in distortion but, based on a rate-distortion analysis, will be offset by an improvement in coding efficiency.

|  | Coeff | | | | | | | | | | | | | | | |
| --- | --- | --- | --- | --- | --- | --- | --- | --- | --- | --- | --- | --- | --- | --- | --- | --- |
|  | C15 | C14 | C13 | C12 | C11 | C10 | C9 | C8 | C7 | C6 | C5 | C4 | C3 | C2 | C1 | C0 |
| HDQ | 0 | 0 | +1 | −1 | +1 | −2 | +2 | +1 | −3 | −5 | −1 | +5 | +8 | +9 | −10 | +15 |
| SDQ | 0 | 0 | 0 | 0 | +1 | −1 | +1 | +2 | −3 | −3 | 0 | +6 | +9 | +9 | −5 | +16 |

In a first embodiment, the SDQ search is limited by selecting a threshold value to define the range around the HDQ quantization levels within which to perform the SDQ search.

Figure 5:
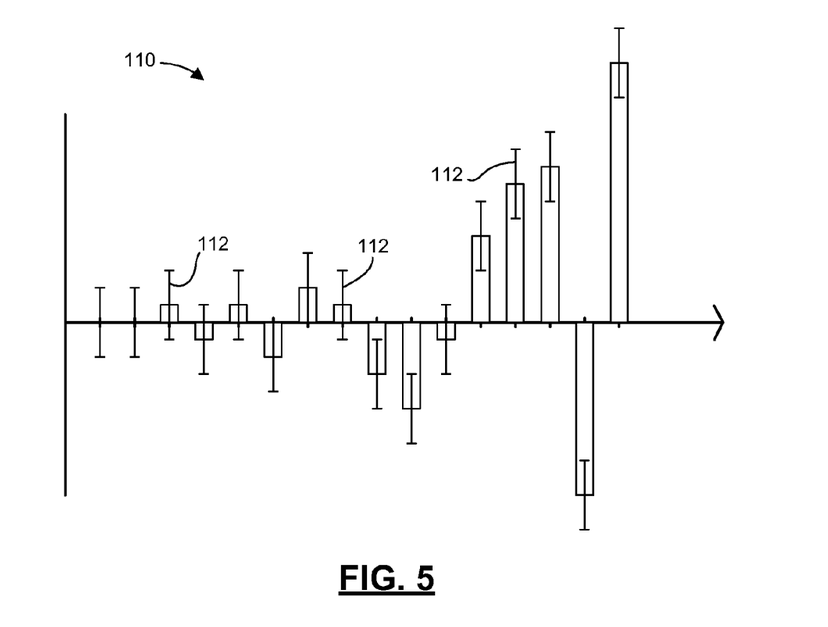
FIG. 5 graphically shows the coefficients from FIG. 4 in a graph illustrating a fixed SDQ search range.

FIG. 5 graphically shows the coefficients from the example of FIG. 4 in a graph 110. The graph 110 shows the magnitude of the HDQ coefficients, which the SDQ search range 112 marked for each coefficient. For example, the search range may be 3 levels, in which case the encoder performs its rate-distortion analysis of possible quantization levels for each coefficient constrained within the range [u=HDQ−3, u=HDQ+3].

The threshold value may be adjustable or configurable. In some example embodiments, the threshold value may be related to the qp parameter. If the quantization step size is smaller, larger magnitude coefficients are likely to result, so a larger threshold value may be desirable.

In a second embodiment, the threshold value varies based on the coefficient position. For example, a lower threshold may be applied to the higher frequency components, e.g. coefficient position C15, C14, etc. since these tend to be at or near zero and a larger search range covering large magnitude quantization levels is unlikely to result in rate-distortion improvements.

Figure 6:
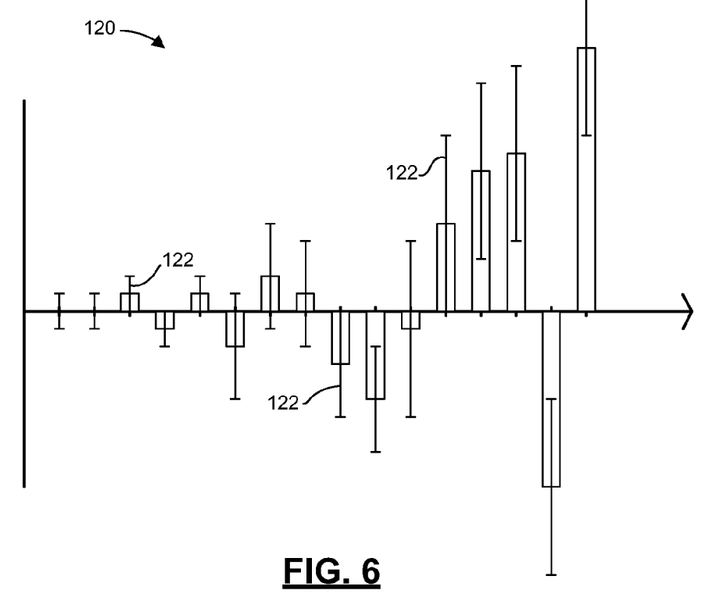
FIG. 6 shows a graph illustrating an example embodiment in which the SDQ search range is based upon the coefficient position.

FIG. 6 shows a graph 120 graphically illustrating an example embodiment in which a search range 122 depends on the coefficient position. The example shown in FIG. 6 uses the HDQ quantization levels shown in FIG. 4 as examples. In this example embodiment, the search range 122 at the lower frequency coefficients, i.e. near C0, is larger and the search range 122 at the high frequency coefficients is smaller. For this example embodiment, coefficients C0 to C5 are given a search range of ±5 quantization levels around the HDQ quantization level, coefficients C6 to C10 are given a search range of ±3 quantization levels around the HDQ quantization level, and coefficients C11 to C15 are given a search range of ±1 quantization level around the HDQ quantization level. It will be appreciated that these example ranges are examples only. In other embodiments, different ranges, or groupings of coefficients may be used. In one example, the range may be based on a linear expression tied to coefficient position. It will also be appreciated that smaller ranges may be used for higher frequency coefficients and larger ranges for lower frequency coefficients, or vice versa.

In yet another embodiment, the threshold value may be related to the coefficient magnitude. Coefficients having lower values, i.e. those likely to be quantized to zero, are less likely to require large search ranges as the likelihood of realizing a rate-distortion improvement by increasing the magnitude of a quantization level that would otherwise be set at or near zero is not very high. In one possible embodiment, the threshold value may be larger for larger magnitude coefficients, and smaller for smaller magnitude coefficients.

Figure 7:
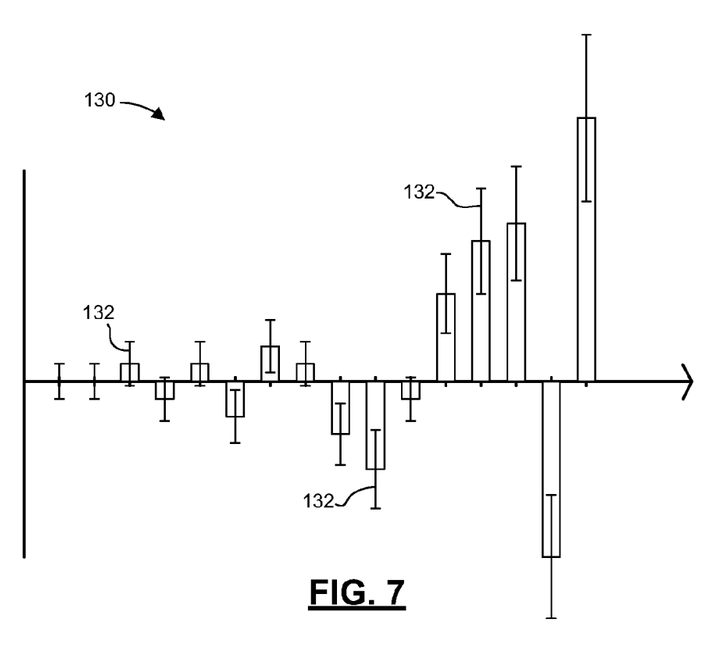
FIG. 7 graphically illustrating an example embodiment in which the search range is dependent upon the HDQ quantization level magnitude.

FIG. 7 shows a graph 130 illustrating an example embodiment in which the search range 132 is dependent upon the HDQ quantization level magnitude. The HDQ levels are those shown as examples in FIG. 4. It will be noted that the search range 132 is larger for large magnitude HDQ quantization levels and smaller for small magnitude HDQ quantization levels.

In some embodiments, variations and combinations of these embodiments may be employed to determine a search range. For example, the search range may depend on both the coefficient magnitude and position using a weighted relation. Other variations will be appreciated by those skilled in the art in light of the present description.

In one embodiment, the HDQ quantization levels may be considered as defining a threshold trellis paths in the SDQ graph. The desired SDQ path through the trellis will be better than the HDQ path in terms of rate-distortion cost. Thus, the rate-distortion cost of HDQ could be used as a constraint to the search space. If the rate-distortion cost of a certain trellis path is greater than that of the HDQ path at the same stage, this path could be marked as invalid.

In yet a further embodiment, the threshold value may be linked to distortion, or in one sense "accumulated distortion". In this example, the threshold value does not apply to each coefficient, but instead to the set of coefficients. In other words, the search range changes dynamically as SDQ quantization levels are selected. If the SDQ quantization levels for previous coefficients in the set differ from the corresponding HDQ quantization levels, the range used to evaluate quantization levels for subsequent coefficients narrows. In one sense, using a threshold value for the set of transform domain coefficients ensures that the distortion is viewed as a "global constraint" across the set of transform domain coefficients. If a large degree of distortion is introduced early in the set by quantization levels differing from the HDQ quantization levels, then the SDQ search range narrows for subsequent coefficients so as to limit the overall distortion accepted.

In order to evaluate distortion as SDQ is applied to a set of transform domain coefficients, in one example embodiment the L1 norm may be used as a measure of accumulated distortion. In this example embodiment, an L1 norm value is tracked as the SDQ process evaluates coefficients in the set, and the difference between an SDQ quantization level and the corresponding HDQ quantization level is added to the L1 norm value. The subsequent coefficient is then evaluated under the constraint that the search space is limited to a threshold value less the L1 norm value. That is, the available threshold value is reduced dynamically by the L1 norm value as the SDQ process moves from coefficient to coefficient in the set. It will be appreciated that the more that SDQ quantization levels vary from corresponding HDQ quantization levels, the more quickly the SDQ quantization levels will be forced to converge closer to HDQ quantization levels as the encoding approaches the lower frequency, and more distortion sensitive, coefficients. In other words, if larger distortion at the higher frequency coefficients is incurred, less distortion at the lower frequency coefficients will be tolerated; conversely, if there is little or no distortion at the higher frequency coefficients, then more distortion at the lower frequency coefficients will be accepted if it results in rate-distortion cost savings.

Using the example coefficients set out above, the following table indicates the distortion for each SDQ quantized coefficient and the L1 norm:

|  | Coeff | | | | | | | | | | | | | | | |
| --- | --- | --- | --- | --- | --- | --- | --- | --- | --- | --- | --- | --- | --- | --- | --- | --- |
|  | C15 | C14 | C13 | C12 | C11 | C10 | C9 | C8 | C7 | C6 | C5 | C4 | C3 | C2 | C1 | C0 |
| HDQ | 0 | 0 | +1 | −1 | +1 | −2 | +2 | +1 | −3 | −5 | −1 | +5 | +8 | +9 | −10 | +15 |
| SDQ | 0 | 0 | 0 | 0 | +1 | −1 | +1 | +2 | −3 | −3 | 0 | +6 | +9 | +9 | −5 | +16 |
| D | 0 | 0 | 1 | 1 | 0 | 1 | 1 | 1 | 0 | 2 | 1 | 1 | 1 | 0 | 5 | 1 |
| L1n | 0 | 0 | 1 | 2 | 2 | 3 | 4 | 5 | 5 | 7 | 8 | 9 | 10 | 10 | 15 | 16 |

If the threshold value against which L1 norm is measured has been set to a value less than 16, then the SDQ outcome will differ from the examples shown in the table above. For example, if the threshold value is set to 12, then at coefficient C1 the SDQ search range will be limited to values within ±2 of the HDQ quantization level since the threshold value (12) less the L1 norm at C2 (10) is 2. Using a rate distortion analysis the encoder will select from a range of quantization levels from −8 to −12 to select the SDQ quantization level for coefficient C1. If the encoder ends up selecting an SDQ quantization level of −8 (based on a rate-distortion analysis) for coefficient C1, then the L1 norm will be 12 (equal to the threshold), and the SDQ quantization level for C0 will be forced to converge to the HDQ quantization level of +15.

Figure 8:
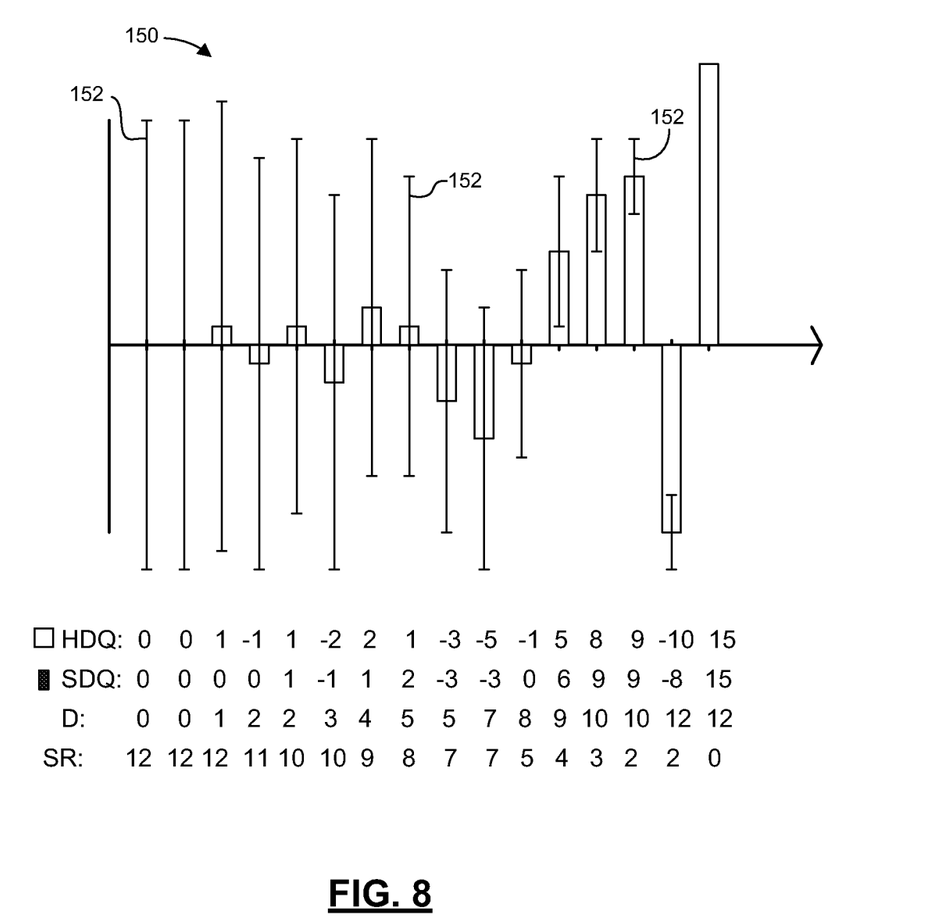
FIG. 8 shows a graph in which the search range is based upon a threshold less the accumulated distortion, as measured by the L1 norm between the HDQ quantization vector and the SDQ quantization vector.

FIG. 8 illustrates this example graphically using a threshold value of 12 and the same example coefficients given above. FIG. 8 shows a graph 150 with a search range 152 that narrows based on the threshold value less the accumulated distortion (as represented by the L1 norm between the HDQ quantization vector and the SDQ quantization vector). It will be noted that, in this example, the search range 152 at coefficient C0 is reduced to zero. It will nevertheless be appreciated that the narrowing search range also assists in improving the speed of the SDQ process by reducing the number of quantization levels to be analyzed even in cases where the search range does not converge to zero.

References is now again made to the example trellis of FIG. 3. It will be appreciated that the L1 norm-based constrained SDQ results in reduction of the number of parallel connections and/or states that need to be evaluated for the coefficients. For example, if the search range is reduced to two quantization levels around the HDQ quantization level, then only five parallel connections between a given state in one of the nodes at a previous state need be evaluated. Moreover, other nodes and/or states may be rendered invalid if the search range is narrowed to a specific range of quantization levels. For example, if the search range is restricted to a range of 3 to 8 as a result of the constrained SDQ, then states which (due to coding syntax) require a quantization level of 1 need not be evaluated. In an embodiment using an L1 norm measure to restrict the number of quantization levels around HDQ that are to be evaluated, the L1 norm measure is tracked for each state based on the R-D optimal path into that state, and the L1 norm measure may then be used to determine the search range for subsequent states that have an incoming path from an earlier state for which L1 norm is known. If the L1 norm measure and the threshold against which it is compared results in a reduction of the number of states and/or quantization levels that require R-D analysis, then the trellis can be built more quickly with reduced computational load.

Figure 9:
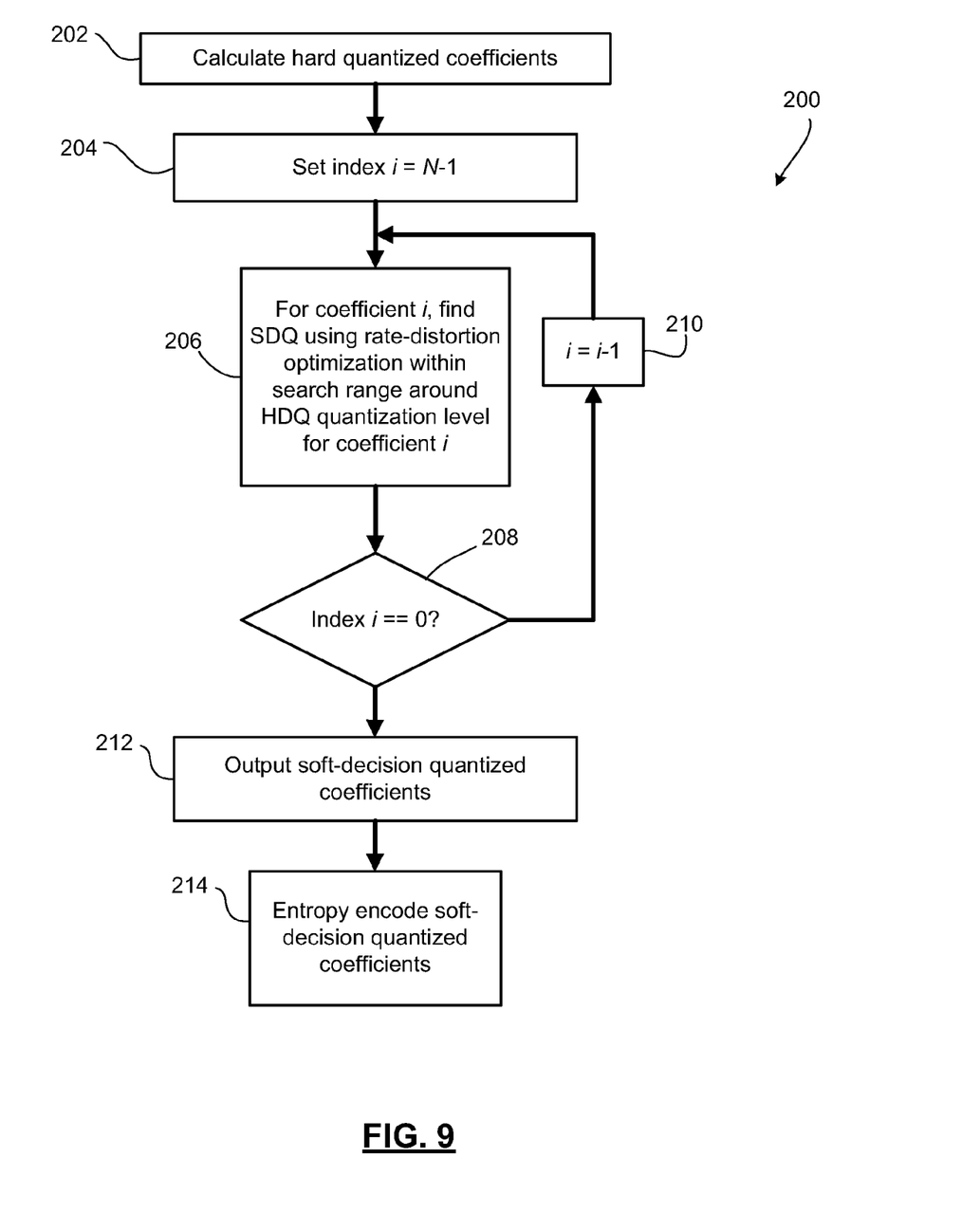
FIG. 9 shows, in flowchart form, a method for encoding a video.

Reference is now made to FIG. 9, which shows, in flowchart form, a method 200 for encoding a video. The method 200 uses constrained soft-decision quantization. The video includes blocks of pixel data, which in many instances has been converted to residual data following a prediction operation. Each block of residual data is transformed using the applicable transform operation (such as DCT) to generate a set of transform domain coefficients. The set of transform domain coefficients are then quantized based on a quantization step size to realize a set of hard-decision quantized coefficients, as indicated by step 202. In step 204, an index i is initialized to N-1, where N is the number of coefficients in the set. In this example, the coefficients are encoded in a reverse order using a zig-zag coding order. The nomenclature C15 to C0, in the case of a 4×4 DCT, indicates the coefficients organized in zig-zag coding order from bottom right corner of a block of transform domain coefficients to the top left corner.

In step 206, for each transform domain coefficient i the encoder performs soft-decision quantization to select an SDQ quantization level for the coefficient. For coefficient i the soft-decision quantization is constrained by a search range around the HDQ quantization level for coefficient i. The search range limits the number of quantization levels evaluated by the SDQ process for each coefficient. Steps 208 and 210 reflect the decrementing of the index i and the repeating of step 206 until the last coefficient is reached.

In many embodiments, steps 206, 208 and 210 include building a trellis of costs reflecting the rate-distortion cost of various quantization levels and the interdependencies amongst quantization levels in successive coefficients and the impact on coding rate based on the coding syntax. Costs at successive states in the trellis may be accumulated such that, at an end state the incoming paths all have a total rate-distortion cost associated with them. As a result, it will be appreciated that the selection of SDQ coefficients may involve tracing back through the trellis from the end-state to the beginning to obtain the set of SDQ quantization levels.

In step 212, the set of SDQ quantization levels are output and in step 214 the encoder entropy encodes the set of SDQ quantization levels in accordance with the applicable coding scheme.

Figure 10:
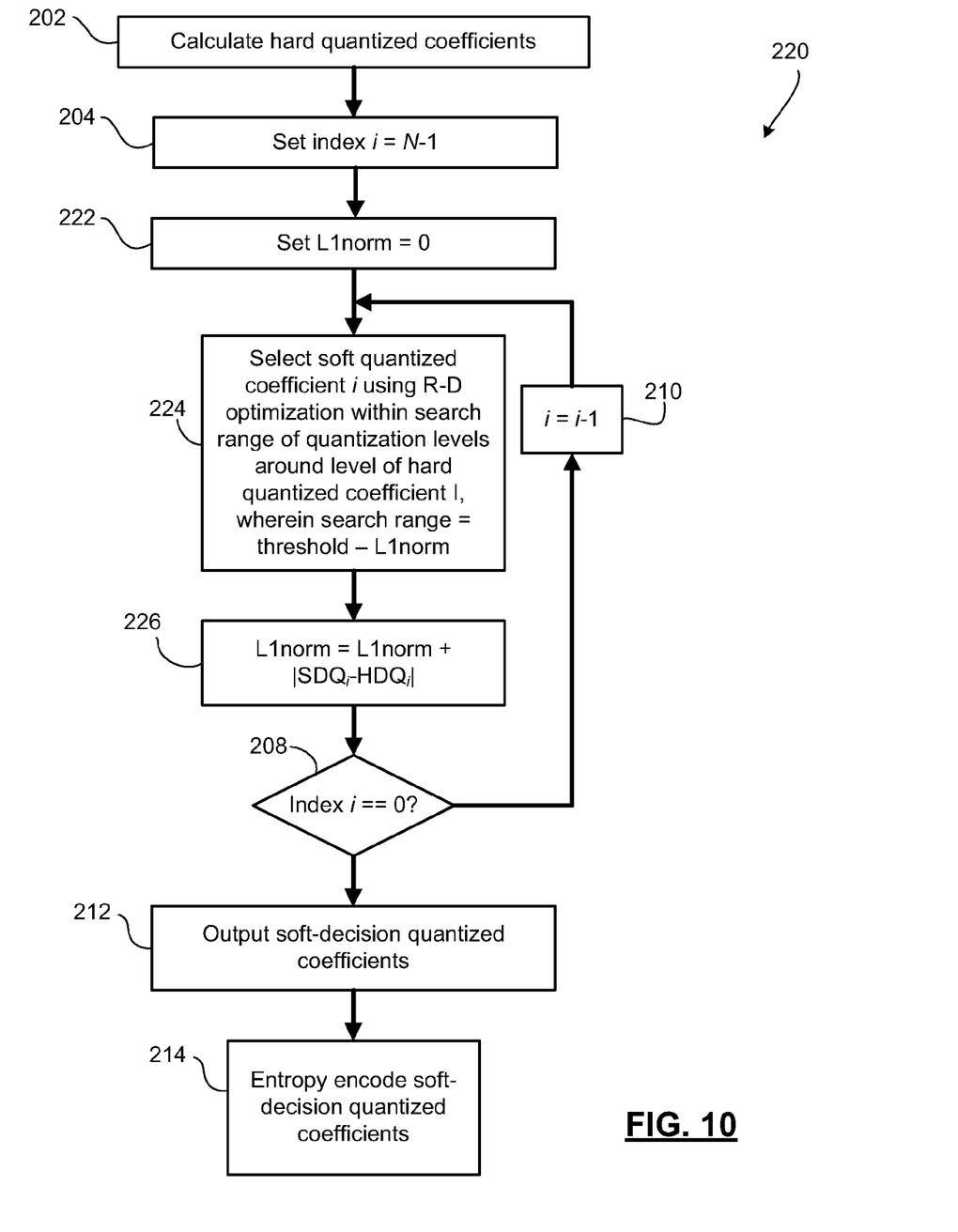
FIG. 10 shows, in flowchart form, another method for encoding a video.

Reference is now made to FIG. 10, which shows in flowchart form another method 220 for encoding a video. The method 220 reflects an example implementation of the L1 norm based process described above in connection with FIG. 8.

The method 220 includes steps 202 and 204. The method 220 then includes step 222, in which the L1 norm value is initialized to zero. The encoder includes a configurable or preset threshold value, against which the L1 norm will be measured to dynamically determine the search range for a given coefficient, as will be described below.

For each coefficient, the encoder performs soft-decision quantization, wherein the soft-decision quantization search is confined to quantization levels within a search range of the corresponding hard decision quantization level for that coefficient. The search range is established by the threshold value less the accumulated distortion represented by the L1 norm.

In step 226, the L1 norm is updated by adding the absolute value of the difference between the soft decision quantization level and the hard decision quantization level.

As illustrated in FIG. 8, the search range shrinks based on accumulated distortion.

Like the method 200, the method 220 includes operations 208, 210, 212, and 214.

Figure 11:
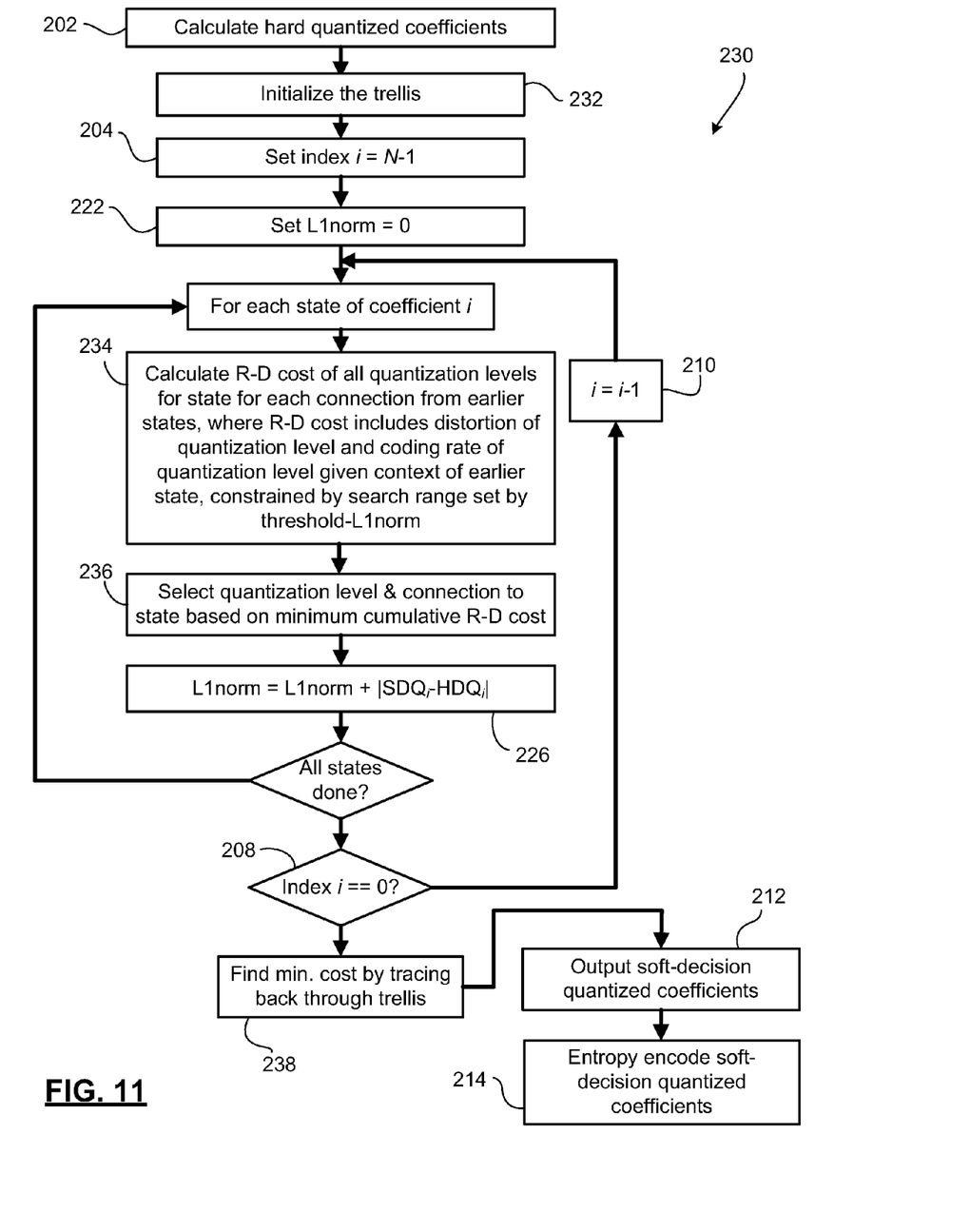
FIG. 11 illustrates a further example method for encoding a video.

Reference is now made to FIG. 11, which illustrates a further example method 230 for encoding a video. This example method 230 illustrates additional details based on the use of a trellis to perform soft-decision quantization. It will be appreciated that the trellis may be implemented in a given embodiment using any suitable data structure for storing information in memory regarding the stages, nodes, states, and connections therebetween, together with associated and accumulated rate-distortion costs and L1 norms.

In method 230, the hard quantized coefficients are calculated in step 202. The trellis is then initialized in step 232. This may include determining which states are valid for a given coefficient and which may be connected to states for a different coefficient based on the coding syntax.

The index i and the L1 norm are initialized in steps 204 and 222, respectively. Steps 234, 236, 226, 208, and 210 represent a trellis-building loop, within which the encoder walks the trellis from C15 to C0 (for the case of a 4×4 DCT), calculating rate-distortion costs for quantization levels, and refining the connections between states based on rate-distortion costs and the L1 norm-based constraints. In particular, within the trellis-building loop, in step 234, for coefficient i, the encoder calculates the rate-distortion cost for each quantization level in each state for the coefficient. The calculation of rate-distortion cost takes into account the distortion associated with using that quantization level for that coefficient and the coding rate, which itself is dependent upon the quantization level used in the previous coefficient, i.e. the "context".

The search in step 234 is constrained by a search range. The search range is set to be within a number of quantization levels of the hard quantized coefficient for that transform domain coefficient. The number of quantization levels for a given state is based on the threshold value less the L1 norm calculated in the previous state. For example, for a state x in coefficient i, one of the incoming paths to the state x is from an earlier state, state w. State w has a rate-distortion cost and L1 norm associated with it. Accordingly, the search of quantization levels for that incoming path is constrained within a search range around the hard quantized coefficient set by the threshold value minus the L1 norm from state w.

For a given state, having calculated the rate-distortion cost associated with each quantization level, i.e. with each path entering the state from a state of an earlier coefficient, the encoder assesses which of these paths and quantization levels represent the minimum accumulated rate-distortion cost. It maintains that path and quantization level as the selected quantization level for the given state, as indicated by step 236.

Having selected the quantization level and incoming connection for a given state, steps 234, 236, and 226 are performed for each valid state in coefficient i. Following this process, each state in coefficient i has one incoming path and each state has selected quantization level and an associated L1 norm.

The trellis-building loop continues until the last coefficient is complete, i.e. until index i=0 (step 208). The last connections are to an end state (EOS). The end state has a number of incoming connections, each of which has an associated cumulative rate-distortion cost. In step 238, the encoder then traces back through the trellis from the end state to the beginning on the basis of the minimum rate-distortion cost, which follows a path that reveals the set of soft-decision quantized coefficients selected within the L1 norm constraints. By tracing back along the path of minimum rate-distortion cost, at each coefficient the encoder obtains the quantization levels and encoding parameters for that coefficient.

In steps 212 and 214, the soft-decision quantized coefficients are output and encoded. As noted above, in some instances by tracing back through the trellis, the encoding parameters for the soft-decision quantized coefficients may be obtained directly from the state information stored in the trellis. In those circumstances, the SDQ coefficients may not be explicitly output as indicated in step 212.

It will be understood that the threshold value against which L1 norm is measured may be preset within the encoder. In some instances the threshold value may be configurable, for example through a user interface. In some instances it may be linked to the quantization steps size, i.e. to the parameter qp. For a small step size, the threshold value may be set larger to allow for greater difference between HDQ quantization levels and SDQ quantization levels given that the magnitude of the coefficients is likely to be larger when using a small step size. As noted above, the threshold value may also be linked to the HDQ magnitudes or other factors.

In one example embodiment, the encoder stores a threshold value selection table, from which it selects a threshold value based on some look-up parameters, such as qp or other factors. The threshold value may be selected on a video-by-video basis, a frame-by-frame basis, or a block-by-block basis, depending on the implementation.

It will also be appreciated that the foregoing example methods of quantizing and entropy encoding a video using constrained soft-decision quantization may be embedded or included within other rate-distortion optimization processes. For example, the constrained soft-decision optimization process may be used within a joint optimization process for selecting optimal coding mode, motion vectors, quantization step sizes, etc. The joint optimization process may be a full product space search or may be iterative.

Although many of the foregoing examples are based on the use of CALVC as a coding scheme, it will be appreciated that the present application applies to other coding schemes, including CABAC. The structure and development of the trellis, and the specifics of the rate-distortion analysis may be varied based on the specific syntax of the applicable coding scheme, as will be appreciated by those skilled in the art having regard to the description herein.

It will be understood that encoding application and/or its subcomponents or parts may be stored in on a computer readable medium, such as a compact disc, flash memory device, random access memory, hard drive, etc.

It will be appreciated that the encoder and/or decoder according to the present application may be implemented in a number of computing devices, including, without limitation, servers, suitably programmed general purpose computers, set-top television boxes, television broadcast equipment, and mobile devices. The encoder and/or decoder may be implemented by way of software containing instructions for configuring a processor to carry out the functions described herein. The software instructions may be stored on any suitable computer-readable memory, including CDs, RAM, ROM, Flash memory, etc.

It will be understood that the encoder and/or decoder described herein and the module, routine, process, thread, or other software component implementing the described method/process for configuring the encoder and/or decoder and/or any of its subcomponents or parts may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

In yet a further aspect, the present application discloses a computer-readable medium having stored thereon computer-executable instructions which, when executed by a processor, configure the processor to execute any one or more of the methods described above.

Certain adaptations and modifications of the described embodiments can be made. Therefore, the above discussed embodiments are considered to be illustrative and not restrictive.

What is claimed is:

1. A method of encoding a video, the video including a block of pixel data, the pixel data for the block having been transformed to a set of transform domain coefficients, the method comprising:
   quantizing the set of transform domain coefficients using a quantization step size to obtain a set of hard quantized coefficients, wherein each hard quantized coefficient is an integer-value hard-quantization level to which the coefficient has been quantized;
   for each of the transform domain coefficients in the set of transform domain coefficients, without changing the quantization step size or other quantization parameters, performing soft decision quantization to obtain a soft quantized coefficient using a rate-distortion calculation over a search range of quantization levels for that transform domain coefficient, wherein the search range of quantization levels for that transform domain coefficient is a range of integers around the integer-value hard-quantization level and wherein that range is constrained within a number of quantization levels of the hard quantized coefficient, and wherein the number of quantization levels is based on a threshold value less accumulated differences between previous soft quantized coefficients for the set of transform domain coefficients and corresponding hard quantized coefficients; and
   entropy encoding the soft quantized coefficients to generate encoded video data.

2. The method claimed in claim 1, wherein the accumulated differences comprises an L1 norm between a vector of the previous soft quantized coefficients and a vector of the corresponding hard quantized coefficients.

3. The method claimed in claim 1, further including building a trellis of costs, wherein the trellis includes a stage for each of the transform domain coefficients, and each stage includes a state for each unique set of coding scheme parameters, and wherein building the trellis includes making connections between states when valid in accordance with the coding scheme, and wherein performing soft decision quantization includes calculating rate-distortion costs for each state in the trellis and selecting a desired quantization level for each state on the basis of realizing a minimum cumulative rate-distortion cost for that state.

4. The method claimed in claim 3, wherein performing soft-decision quantization includes limiting the calculation of rate-distortion costs for each state on the basis of the search range.

5. The method claimed in claim 4, further comprising tracing back through the trellis from an end state to the beginning on the basis of realizing a minimum cumulative rate-distortion cost to obtain the soft quantized coefficients.

6. The method claimed in claim 1, wherein the rate-distortion calculation for a given quantization level includes determining distortion associated with the given quantization level and determining the coding rate impact for the given quantization levels based on a transition from an earlier quantization levels of a previous coefficients in the set of transform domain coefficients.

7. The method claimed in claim 6, wherein the coding rate impact is based on the coding syntax of the coding scheme to be used for entropy encoding.

8. The method claimed in claim 1, wherein the number of quantization levels is based on a position of that transform domain coefficient in the set of transform domain coefficients.

9. The method claimed in claim 1, wherein the number of quantization levels for the search range for that transform domain coefficient is based on the magnitude of the corresponding hard quantized coefficient for that transform domain coefficient.

10. An encoder for encoding a video, the encoder comprising:
    a processor;
    a memory; and
    an encoding application stored in memory and containing instructions for configuring the processor to encode the video by
       quantizing the set of transform domain coefficients using a quantization step size to obtain a set of hard quantized coefficients, wherein each hard quantized coefficient is an integer-value hard-quantization level to which the coefficient has been quantized;
       for each of the transform domain coefficients in the set of transform domain coefficients, without changing the quantization step size or other quantization parameters, performing soft decision quantization to obtain a soft quantized coefficient using a rate-distortion calculation over a search range of quantization levels for that transform domain coefficient, wherein the search range of quantization levels for that transform domain coefficient a range of integers around the integer-value hard-quantization level and wherein that range is constrained within a number of quantization levels of the hard quantized coefficient, and
       entropy encoding the soft quantized coefficients to generate encoded video data,
       and wherein the number of quantization levels is based on a threshold value less accumulated differences between previous soft quantized coefficients for the set of transform domain coefficients and corresponding hard quantized coefficients.

11. The encoder claimed in claim 10, wherein the accumulated differences comprises an L1 norm between a vector of the previous soft quantized coefficients and a vector of the corresponding hard quantized coefficients.

12. The encoder claimed in claim 11, wherein the encoding application further configures the processor to build a trellis of costs, wherein the trellis includes a stage for each of the transform domain coefficients, and each stage includes a state for each unique set of coding scheme parameters, and wherein the processor is further configured to make connections between states when valid in accordance with the coding scheme, and wherein the processor is further configured to perform soft decision quantization by calculating rate-distortion costs for each state in the trellis and selecting a desired quantization level for each state on the basis of realizing a minimum cumulative rate-distortion cost for that state.

13. The encoder claimed in claim 12, wherein the processor is further configured to perform soft-decision quantization by limiting the calculation of rate-distortion costs for each state on the basis of the search range.

14. The encoder claimed in claim 13, and wherein the processor is further configured to trace back through the trellis from an end state to the beginning on the basis of realizing a minimum cumulative rate-distortion cost to obtain the soft quantized coefficients.

15. The encoder claimed in claim 10, wherein the processor is further configured to calculate the rate-distortion for a given quantization level by determining distortion associated with the given quantization level and determining the coding rate impact for the given quantization levels based on a transition from an earlier quantization levels of a previous coefficients in the set of transform domain coefficients.

16. The encoder claimed in claim 15, wherein the coding rate impact is based on the coding syntax of the coding scheme to be used for entropy encoding.

17. The encoder claimed in claim 10, wherein the number of quantization levels is based on a position of that transform domain coefficient in the set of transform domain coefficients.

18. The encoder claimed in claim 10, wherein the number of quantization levels for the search range for that transform domain coefficient is based on the magnitude of the corresponding hard quantized coefficient for that transform domain coefficient.

19. A non-transitory computer-readable medium having stored thereon computer-executable instructions which, when executed by a processor, configure the processor to execute the method claimed in claim 1.

* * * * *